UNITED STATES PATENT OFFICE.

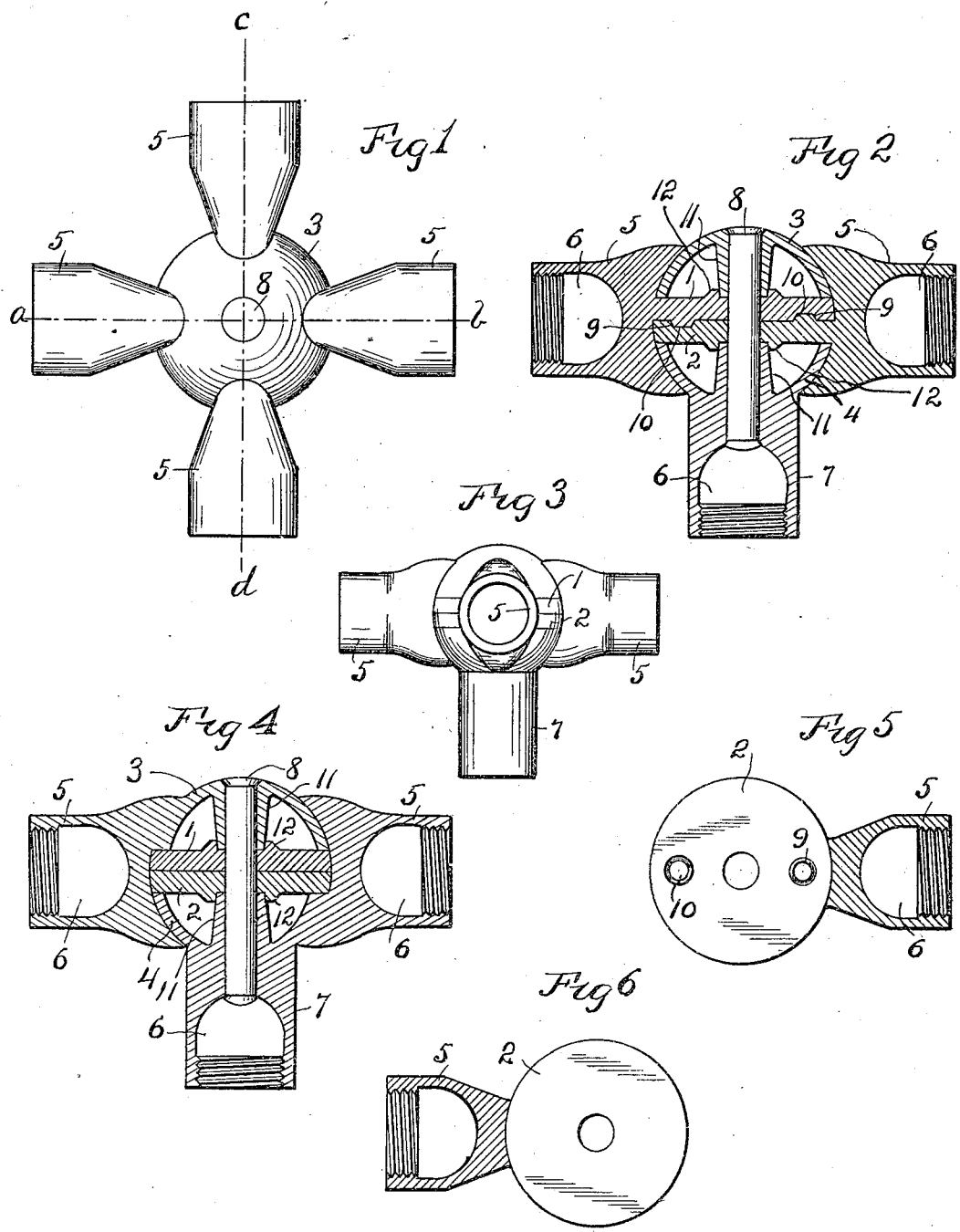

ALBERT F. MILLER, OF KANSAS CITY, KANSAS.

PIPE OR ROD CONNECTOR.

961,982.  Specification of Letters Patent.  Patented June 21, 1910.

Application filed February 12, 1910. Serial No. 543,547.

*To all whom it may concern:*

Be it known that I, ALBERT F. MILLER, a citizen of the United States, residing at Kansas City, in the county of Wyandotte and State of Kansas, have invented certain new and useful Improvements in Pipe or Rod Connectors, of which the following is a specification.

My invention relates to improvements in pipe or rod connectors.

The object of my invention is to provide a pipe or rod connector for rigidly connecting two or more pipes or rods, which will present a smooth and finished appearance, and which will permit the rods or pipes to be adjusted to different angles relative to each other.

My invention is particularly adapted for use in constructing pipe or rod frameworks, such as are employed for fire-escapes or railings for stairways.

This application is in part a division of an application filed by me June 24, 1909, having Serial Number 504,131.

The novel features of my invention are hereinafter fully described and claimed.

In the accompanying drawings, illustrative of my invention, Figure 1 is a top view of the connector. Fig. 2 is a vertical section on the dotted line $a$—$b$ of Fig. 1. Fig. 3 is a side elevation. Fig. 4 is a vertical section on the dotted line $c$—$d$ of Fig. 1. Fig. 5 is a plan view of one of the disk like connector members shown in Fig. 2 and which are provided with means for locking said members against rotation relative to each other. Fig. 6 is a plan view of one of the disk like connector members of a modified form of my invention, in which the disk like members are rotative relative to each other.

Similar reference characters denote similar parts.

Referring to the form of my invention shown in Figs. 1 to 5 inclusive, 1 and 2 denote two horizontal flat disk like members of equal diameters disposed flatwise one upon the other and which are intermediate of and bear respectively against the plane sides of two hemispherical members 3 and 4, having equal diameters, and which are disposed in reverse positions one above the other. Each of the members 1, 2, 3 and 4 is provided with a horizontal boss 5, preferably provided with a radial screw threaded hole 6, adapted to have fitted therein a threaded rod or pipe, not shown.

The member 4 is provided on its under side with a similar downwardly extending boss 7 provided with a screw threaded hole 6. The boss 5 of each member 1, 2, 3 and 4 at its inner end overlaps and is snugly fitted to the curved peripheries of the three other members. Preferably the bosses 5 are disposed so as to be longitudinally bisected by the horizontal plane which bisects the sphere formed by the members 1, 2, 3 and 4.

A pivot pin 8 extends vertically and centrally through the members 1, 2, 3 and 4. This pin not only retains the members secured to each other, but also permits the members 3 and 4 to be rotated to different positions relative to the members 1 and 2 and relative to each other. In the form of my invention shown in Figs. 1 to 5 inclusive, the disk like members 1 and 2 are preferably locked from rotation relative to each other by projections 9 which are fitted into recesses 10 provided in the opposing disk like members. These projections and recesses may, however, be omitted, as shown in Fig. 6, when it is desired to have the disk members 1 and 2 rotate relative to each other.

Preferably the plane sides of the members 3 and 4 may be hollowed, as shown, and provided with central vertical studs 11 which respectively abut against adjacent faces of the members 1 and 2. The flat upper side of the member 1 and the flat lower side of the member 2 are preferably provided each with an annular central flange 12 fitted to the periphery of the adjacent stud 11.

The members when connected as described form a sphere with radial peripheral bosses. By reason of this shape and by reason of some of the bosses being snugly fitted to the curved peripheries of adjacent members, great strength of construction is afforded.

Modifications of my invention, within the scope of the appended claims, may be made without departing from its spirit.

Having thus described my invention, what I claim and desire to secure by Letters Patent, is:—

1. In a pipe or rod connector, the combination with two members each having a substantially hemispherical portion, of two other members, each having a disk like portion, said disk like portions being disposed flatwise against each other and against the plane sides of said hemispherical portions respectively, each of said members having a peripheral boss having a radial hole adapted to receive a pipe or rod and fitted to the curved peripheries of the other three members, and means for pivotally supporting said four members on an axis extending centrally through said disk like and hemispherical portions.

2. In a pipe or rod connector, the combination with two members each having a substantially hemispherical portion, of two other members, each having a disk like portion, said disk like portions being disposed flatwise against each other and against the plane sides respectively of said hemispherical portions, each of said members having a peripheral boss having a radial hole adapted to receive a pipe or rod and fitted to the curved peripheries of the other three members, the disk like members having means for locking them against rotation relative to each other, and means for pivotally supporting said four members on an axis which extends centrally through said disk like and hemispherical portions, and upon which the hemispherical members may swing relative to the other members and relative to each other.

3. In a pipe or rod connector, the combination with two members each having a substantially hemispherical portion, of two other members, each having a disk like portion, said disk like portions being disposed flatwise against each other and against the plane sides of said hemispherical portions, each of said members having a peripheral boss having a radial hole adapted to receive a pipe or rod and fitted to the curved peripheries of the other three members, one of said disk like portions having a projection and the other a recess in which the projection is fitted for preventing relative rotation of the disklike members, and means for pivotally mounting said four members on an axis which extends centrally through said disklike and hemispherical portions.

4. In a pipe or rod connector, the combination with two members each having a substantially hemispherical portion, of two other members each having a disk like portion, said disk like portions being disposed flatwise against each other and against the plane sides of said hemispherical portions respectively, each of said members having a peripheral boss with a radial hole adapted to receive a pipe or rod and fitted to the curved peripheries of the other three members, one of said hemispherical members having another boss similar and disposed radially and centrally at right angles to the other bosses, and means for pivotally mounting said four members on an axis extending centrally through said disklike and hemispherical portions.

In testimony whereof I have signed my name to this specification in presence of two subscribing witnesses.

ALBERT F. MILLER.

Witnesses:
F. W. MEYER,
E. B. HOUSE.